United States Patent [19]
Droste

[11] Patent Number: 5,802,490
[45] Date of Patent: Sep. 1, 1998

[54] TORQUE CONVERTER REGULATOR AND CLUTCH LOCKOUT SYSTEM FOR AN AUTOMOTIVE VEHICLE

[75] Inventor: Timothy A. Droste, Howell, Mich.

[73] Assignee: Ford Global Technologies, Inc., Dearborn, Mich.

[21] Appl. No.: 602,558

[22] Filed: Feb. 20, 1996

[51] Int. Cl.$^6$ .................. G06F 17/00; F16H 61/14
[52] U.S. Cl. .................. 701/51; 701/67; 701/68; 192/3.28; 192/3.29; 192/3.3; 192/3.33; 477/62; 477/169
[58] Field of Search .................. 364/424.08, 424.096, 364/424.097; 477/65, 63, 62, 143, 169; 192/3.3, 3.31, 3.28, 3.33, 3.29

[56] References Cited

U.S. PATENT DOCUMENTS

| | | | |
|---|---|---|---|
| 4,665,770 | 5/1987 | Van Selous | 477/60 |
| 4,768,632 | 9/1988 | Moan | 192/3.3 |
| 5,029,087 | 7/1991 | Cowan et al. | 364/424.97 |
| 5,058,716 | 10/1991 | Lippe et al. | 192/3.33 |
| 5,251,734 | 10/1993 | Benford et al. | 192/3.28 |
| 5,303,616 | 4/1994 | Palansky et al. | 477/63 |
| 5,389,046 | 2/1995 | Timte et al. | 475/127 |
| 5,637,053 | 6/1997 | Droste et al. | 477/169 |

Primary Examiner—Tan Q. Nguyen
Attorney, Agent, or Firm—Frank G. McKenzie

[57] ABSTRACT

A system for controlling operation of a bypass clutch for a torque converter in an automatic transmission includes a clutch capacity control valve, which connects a source of fluid pressure to a space between a converter clutch friction surface and an impeller casing in response to a force balance produced by variable pressure control signal and an unlock control pressure signal, produced by a converter lockout valve. The a clutch capacity control valve also supplies pressurized fluid to a torus of the torque converter. The valve includes four control lands connecting 10 ports, all of which are active and independent.

7 Claims, 5 Drawing Sheets

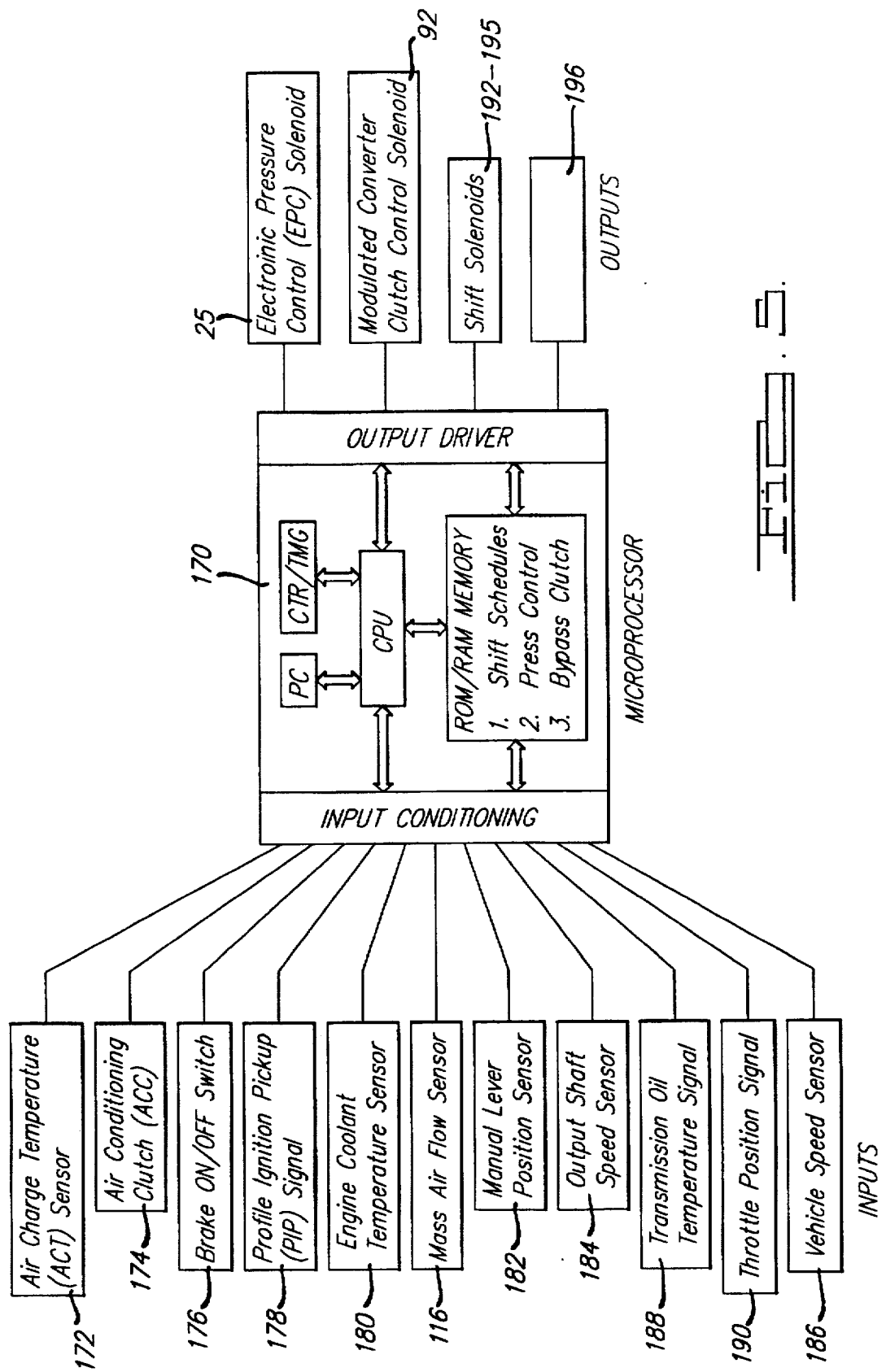

TORQUE CONVERTER REGULATOR AND CLUTCH LOCKOUT SYSTEM FOR AN AUTOMOTIVE VEHICLE

BACKGROUND OF THE INVENTION

1. Field of the Invention

This invention relates to the control system for an automatic transmission, particularly with respect to the control of a torque converter bypass clutch.

2. Prior Art

An hydrokinetic torque converter, which forms an hydrokinetic torque flow path from the engine crankshaft to the input elements of a gear ring of an automatic transmission, includes a turbine and an impeller arranged in a toroidal fluid flow circuit. It includes also a friction bypass clutch adapted to connect the impeller to the turbine to establish a mechanical torque flow path in parallel with respect to the hydrokinetic torque flow path of the torque converter.

The hydrokinetic torque converter includes a bypass clutch controlled by an hydraulic valve system. The bypass clutch has features that are common to the control system described in U.S. Pat. No. 5,029,087, and the hydrokinetic torque converter control system of U.S. Pat. No. 5,303,616. These patents are assigned to the assignee of our present invention. The '087 patent describes a torque converter control system having a lock-up clutch for establishing a controlled mechanical torque flow path between the engine and the transmission gearing and for modifying the bypass clutch capacity during shift intervals. That patent discloses an electronic control strategy for effecting a control slip in a torque converter bypass clutch, whereby the bypass clutch is actuated by modulated converter clutch solenoid pressure from a clutch solenoid valve to effect varying clutch capacity so that the resulting control slip results in an actual slip that approaches a target slip determined by the operating parameters of the driveline The '616 patent describes a torque converter control system having a lock-up clutch for establishing a controlled mechanical torque flow path between the engine and transmission gearing and for modifying the bypass clutch capacity during gearshift intervals.

SUMMARY OF THE INVENTION

An object of this invention is to provide a converter clutch valve that controls torque converter operation in an open or unlocked condition, hard locked condition, and modulated slip condition. The converter clutch valve has the porting arranged to permit a four-land sliding spool valve to be connected to ten active, independent ports without increasing its length in relation to such valves having nine ports. The valve provides an independent override or lockout port to ensure the a motor vehicle can be driven from a stop with the torque converter open, i.e., with its bypass clutch disengaged, if a failure of the converter control system should occur.

In realizing these objects and advantages, the system according to this invention for controlling locked and unlocked operation of a torque converter clutch includes a torque converter having an impeller, turbine and stator defining a toroidal fluid flow path, a converter clutch for driveably connecting and releasing the impeller and turbine, a first line for supplying pressurized fluid to a first side of the converter clutch, and a second line for venting and pressurizing a second side of the converter clutch. The system further includes a vent port, a source of converter feed pressure. A lockout means, preferably a converter lockout valve, produces converter unlock pressure having a first magnitude representing a command to unlock the converter and a second magnitude representing a command to lock the converter.

A source of converter control pressure produces a variable pressure including a third magnitude representing a command to unlock the converter and a fourth magnitude representing a command to lock the converter.

A converter regulator valve unlocks the converter clutch by opening a connection among the source of converter feed pressure and I:he first and second lines when the lockout means produces the first magnitude. The converter regulator valve unlocks the converter clutch when the lockout means produces the second magnitude and the source of converter control pressure produces the third magnitude. The converter regulator valve locks the converter clutch by opening a connection between the source of converter feed pressure and the first line, and between the second line and vent port when the lockout means produces the second magnitude and the source of converter control pressure produces the fourth magnitude.

BRIEF DESCRIPTION OF THE DRAWINGS

FIG. 5 is a schematic diagram of the microprocessor, sensors, and solenoid-controlled valves used to control operation of the transmission.

DESCRIPTION OF THE PREFERRED EMBODIMENT

Figure 1A:
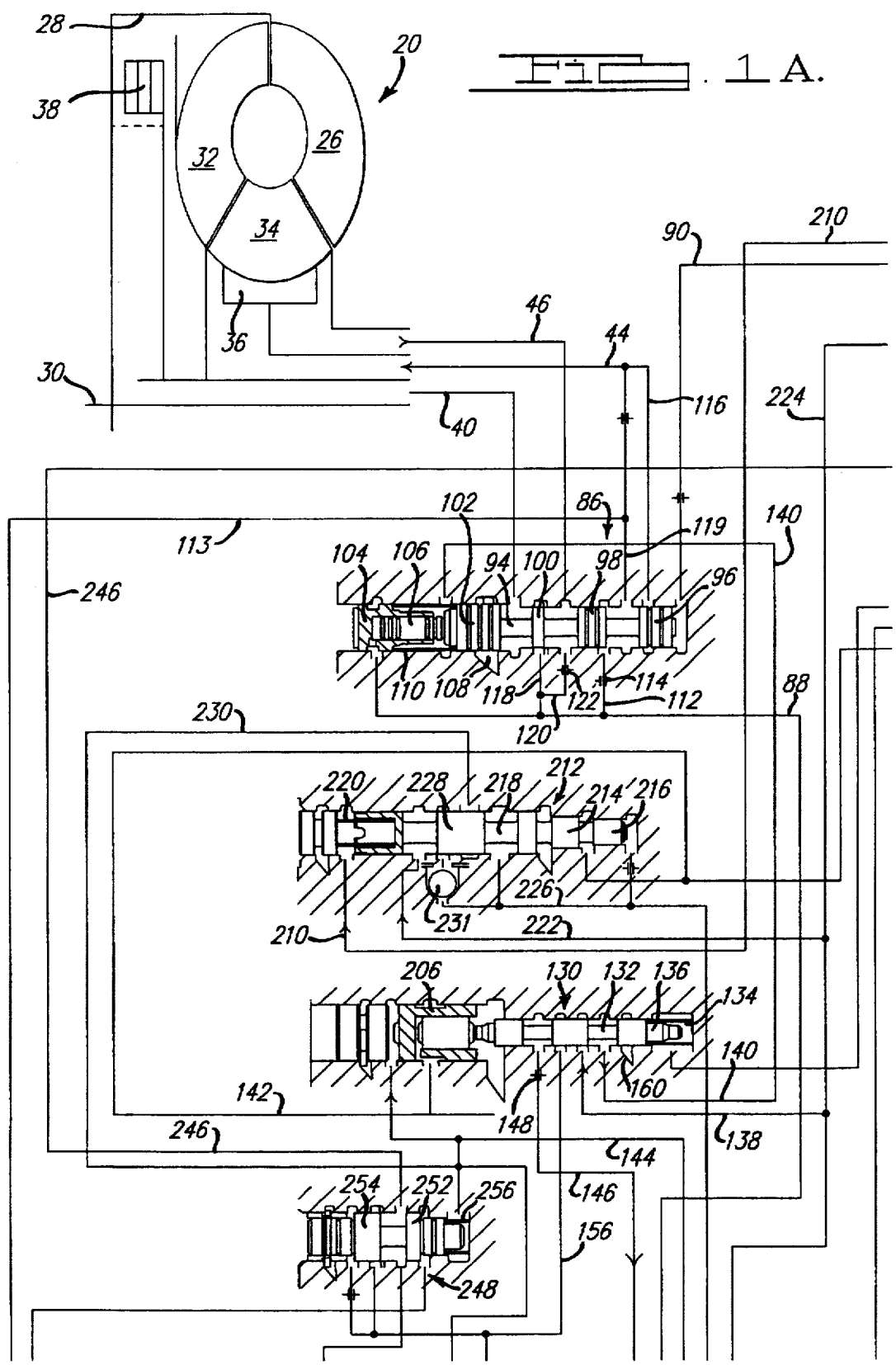
FIGS. 1A, 1B, and 1C, in combination, show a schematic diagram of a hydraulic control circuit for an automatic transmission.
Figure 1B:
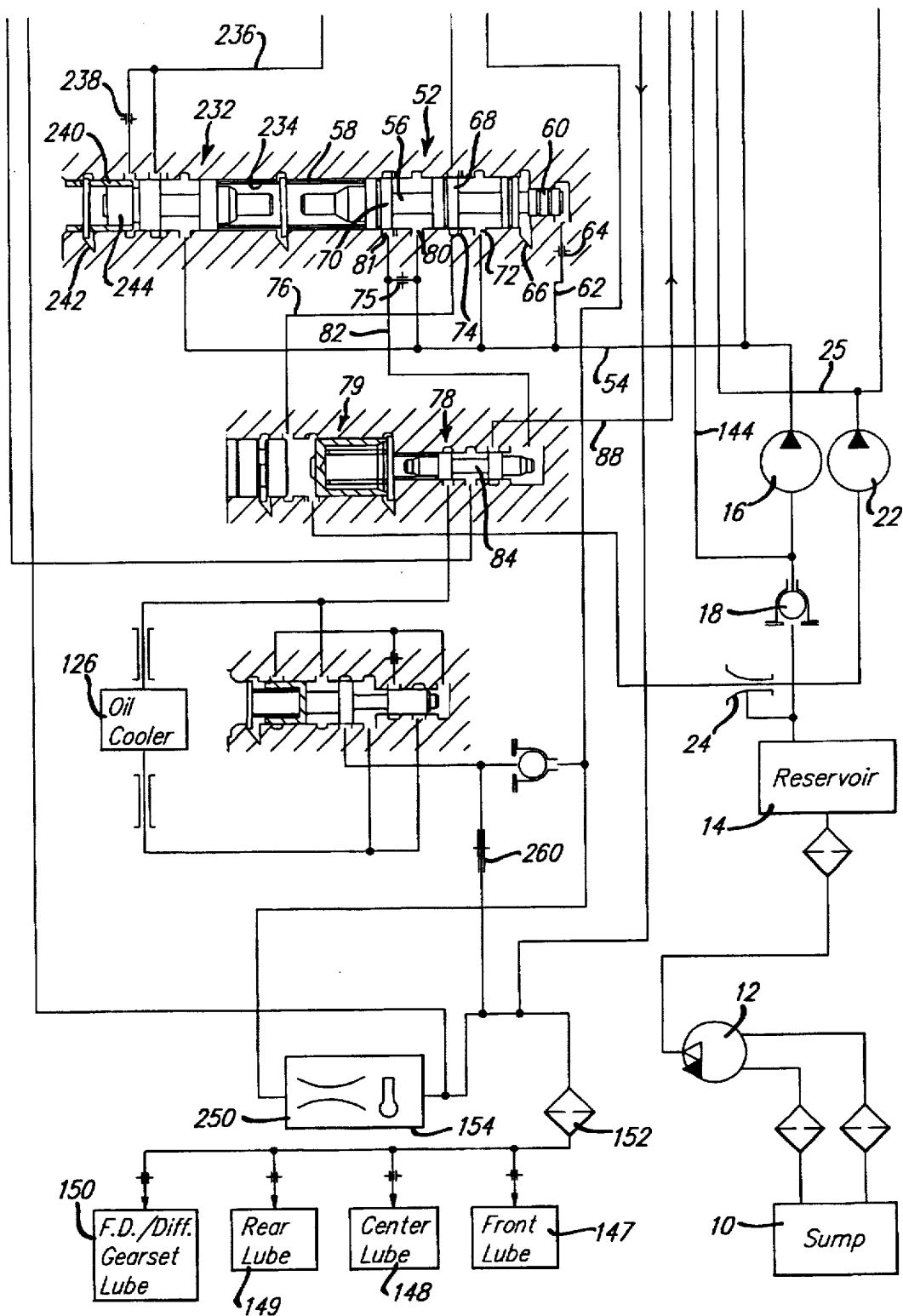
Figure 1C:
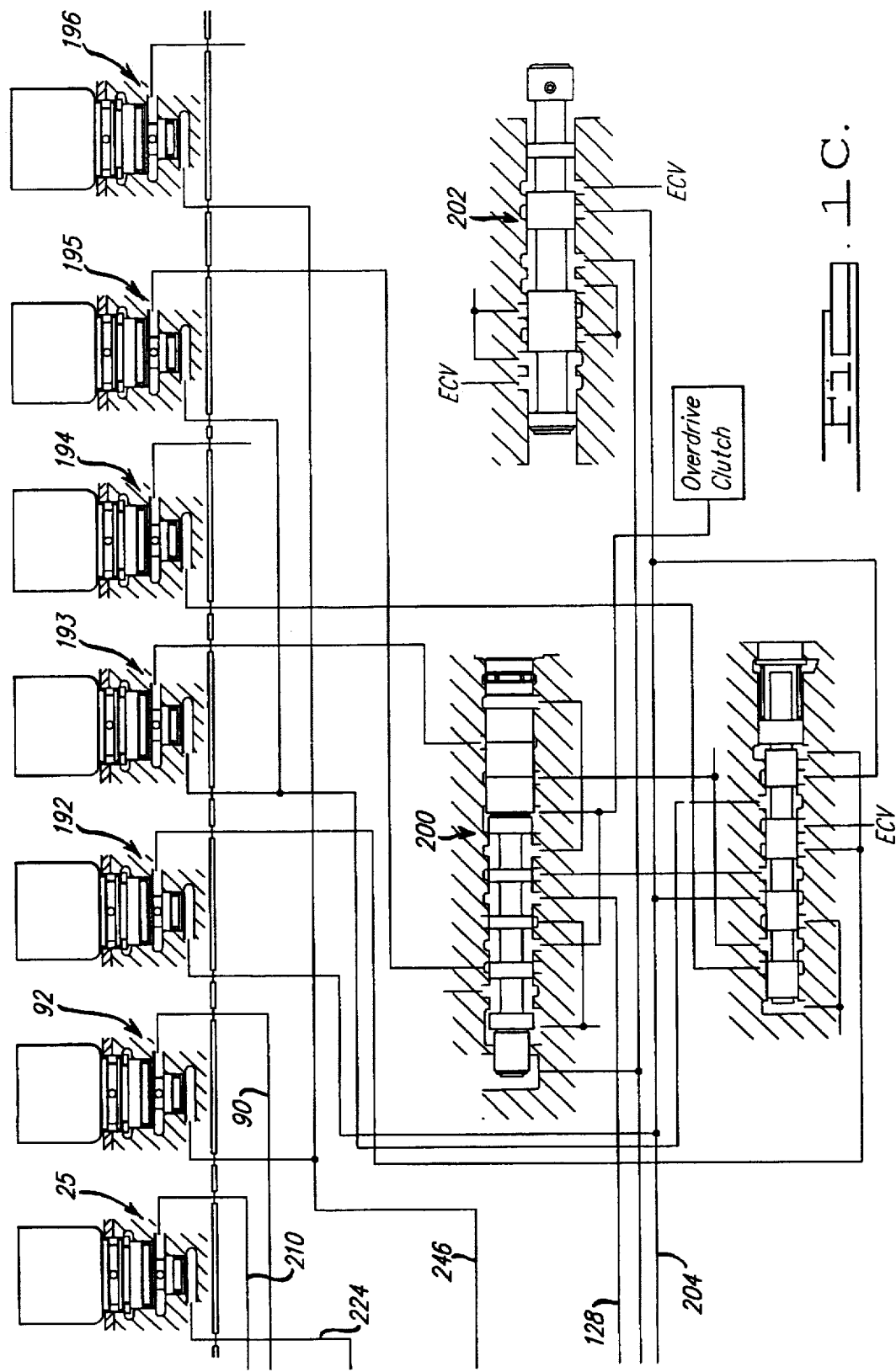
Figure 2:
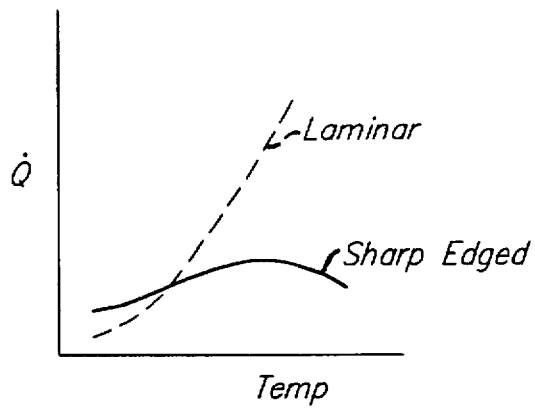
FIG. 2 shows the variation of flow rate through a sharp-edged orifice and laminar orifice as temperature changes.
Figure 3:
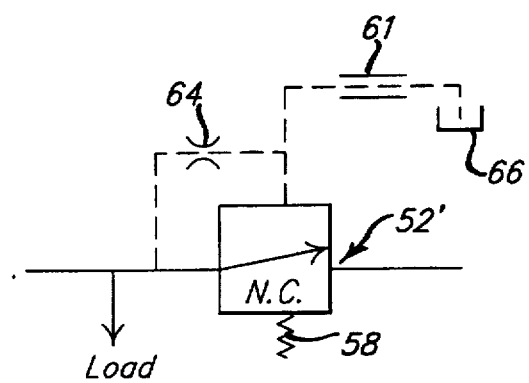
FIG. 3 is a schematic diagram of the ANSI symbols for a relief valve modified to include a sharp-edged orifice and laminar orifice.
Figure 4:
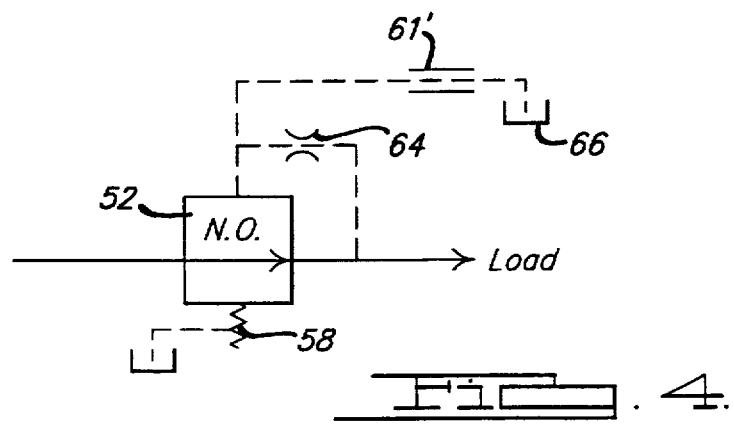
FIG. 4 is a schematic diagram of the ANSI symbols for reducing valve modified to include a sharp-edged orifice and laminar orifice.

Referring to FIGS. 1A and 1B, the hydraulic system for controlling and actuating components of an automatic transmission for an automotive vehicle includes a sump 10 where hydraulic fluid is contained and from which it is drawn by a scavenge pump 12 and delivered to a reservoir 14. The inlet of a high flow rate pump 16 is connected through check valve 18 to the reservoir. The output of pump 16, secondary regulated pressure SRP, is maintained at approximately 120 psig or greater through operation of SRP regulator valve 52. The inlet of pump 22 is drawn partially from reservoir 14 through a supercharging nozzle 24, which carries fluid through the system from various components of the transmission. The outlet of pump 22 in line 24 is maintained at regulated line pressure through control of a pressure signal produced by a variable force solenoid-operated valve 25 and is applied to a clutch capacity line pressure regulator valve 212.

Torque converter 20 includes a bladed impeller wheel 26, permanently driveably connected by an impeller casing 28 to the crankshaft of an internal combustion engine 30. A bladed turbine wheel 32 and a bladed stator wheel 34 are mounted in relation to the impeller so that they form a toroidal flow path within which the hydraulic fluid of the torque converter circulates and rotates about the axis of the torque converter. Stator wheel 34 is mounted on one-way clutch 36 to provide one-way drive connection to the transmission casing. A torque converter lockout or bypass clutch 38, when engaged, produces a mechanical drive connection between the turbine and impeller and, when disengaged, permits a hydrokinetic drive connection between the turbine and impeller. Clutch 38 is disengaged or unlocked and the torque converter is opened when CBY pressure in line 40 is applied to the space between the impeller casing and the friction surface of clutch 38 that engages casing 28.

CBY pressure is greater than CI pressure in line 46.

Line 44, at CT pressure, is drained through an oil cooler 126, and CI pressure in line 46 is supplied to the torus of the torque converter through orifice 122 when clutch 38 is disengaged.

Secondary Regulated Pressure Valve

A temperature compensated, pressure limiting valve 52 produces an output, SRPX pressure, carried in line 82 to anti-drain back valve 78, whose output, torque converter feed pressure TCF, is carried in line 88 to the converter regulator valve 86. Secondary regulated pressure, controlled by valve 52, is carried through line 54.

Valve 52 includes a spool 56, urged by a spring 58 rightward in the valve bore, which rightward movement is limited by contact of control lands 60 against the valve body. SRP feedback pressure in line 62 enters the valve through a sharp edged orifice 64. The radial space between lands 60 and the valve bore defines a laminar orifice, which extends along the axis of valve 52 from the feedback port, connected through line 62 to vent port 66. Preferably, the diameter of orifice 64 is 1.0 mm, the diameter of lands 60 is 14.994 mm, and the diameter of the bore adjacent lands 60 is 15.019 mm.

Throughout this discussion, a fixed or sharp-edged orifice means a constricted hydraulic passage, through which the flow rate varies nonlinearly with a pressure drop across the orifice, approximately as the square root of the pressure drop, and the flow rate varies substantially linearly with the temperature of fluid, such as commercially available transmission hydraulic fluid, flowing through the orifice. A laminar orifice means a constricted passage, through which the flow rate varies linearly and directly with the pressure drop across the orifice, and exponentially (or logarithmically) with the temperature of fluid flowing through the orifice.

Valve 52 further includes control lands 68, 70; SRP input port 80, SRPX outlet port 81; supercharge outlet port 74, connected by line 76 to supercharge relief valve 78.

Relief valve 52 is normally closed by spring 58, which causes spool 56 to move to the right-hand extremity of the valve while the flow rate from pump 16 is so low that SRP pressure is relatively low. In that position, line 76 is closed by land 68 from SRP line 54, and converter feed line 82 is closed by land 70 from SRP line 54. Converter feed line 82 is connected through orifice 75 to SRP line 54. As the flow rate from pump 16 and SRP pressure rise, control pressure on the right-hand end of spool 56 first opens SRPX output port 81, thereby connecting SPR line 54 to anti-drain back valve 78 through line 82. Pressure SRPX in line 82 moves spool 84 of anti-drain back valve 78 leftward, thereby connecting torque converter feed pressure TCF in line 82 to converter regulator valve 86 through line 88. As SRP rises yet further, land 68 throttles SRP at port 74 so that fluid at SRP is connected to line 76, nozzle 24, check valve 18, and line 144.

The feedback chamber at the right-hand end of the bore of valve 52 is exhausted through a high resistance laminar orifice 60 and is fed through a viscosity insensitive fixed orifice 64. At automatic transmission fluid temperatures below 150° F., flow through the laminar orifice is negligible; therefore, the steady-state differential pressure across the fixed orifice is negligible. At fluid temperatures above 200° F., leakage through laminar orifice 60 increases. In this manner, a pressure divider is established, and the feedback pressure flow through valve 52 is thereby reduced as temperature rises above 200° F. in proportion to the hydraulic resistance values of the two orifices 60, 64.

Converter Regulator Valve

Converter clutch regulator valve 86 controls three modes of operation: clutch disengaged or open converter operation; clutch engaged or hard locked converter operation; and modulated slip or partial engagement of the torque converter clutch 38. A variable pressure signal TCC is carried in line 90 to the right-hand end of valve 86 from a converter clutch solenoid-operated valve 92. The magnitude of this pressure signal is proportional to a predetermined clutch torque capacity and a pulse width modulated PWM duty cycle control signal produced by a microprocessor and applied to the solenoid of valve 92. Valve 86 modulates differential pressure across the friction surfaces of clutch 38 in proportion to the TCC commanded pressure and the magnitude of the PWM duty cycle and the magnitude of the PWM duty cycle.

Valve 86 includes a spool 94 moveable within the valve bore and carrying four control lands 96, 98, 100, and 102. Valve sleeve 104 is fixed in position in the valve chamber by a retainer, the sleeve supporting a booster spool 106, which is urged by torque converter feed TCF pressure rightward against the left-hand end of spool 94. A vent port 108 communicates with the valve chamber and is opened and closed by control land 102. A compression spring 110 urges spool 94 rightward within the valve chamber.

Line 88 carries torque converter feed pressure to passage 112, and through orifice 114, to the valve bore or chamber. Passages 112, 1.18, and 120 connect line 88 to the valve chamber at mutually spaced positions.

Line 40 connects an outlet port of valve 86 to the passage through which clutch 38 is disengaged. Line 44 connects the return line from the torque converter directly to torque converter exhaust line 113, 114, and through lines 116, 119, which are connected to the ports of valve 86. Line 46 carries fluid at converter feed pressure to torque converter 20 through valve 86.

The torque converter 20 is opened, i.e., bypass clutch 38 is disengaged, when the PWM duty cycle supplied to the solenoid of the converter clutch solenoid-operated valve 92 is zero, thereby reducing pressure to zero in line 90 and at the right-hand end of spool 94. In this instance, torque converter feed pressure operating at the left-hand end of spool 106 forces spool 94 to the right-hand extremity of the valve chamber. In this position, valve 86 connects line 118 to line 40, thereby pressurizing the space between impeller cover 28 and the friction surface of clutch 38. Valve 86 connects line 120 through orifice 122 to line 46, through which hydraulic fluid is delivered to the torus of the torque converter. Fluid at the exit of the torus, carried in line 44, enters the valve chamber through lines 116, 119, and is carried in converter exhaust TCX line 113 to oil cooler 126 through supercharge drain back valve 78. Spool 84 of valve 78 will have moved to the left-hand end of its chamber against the effect of the compression spring due to the presence of SRPX pressure at the right-hand end of spool 84, as has been described above with reference to the operation of the valve 52.

A 1-2 shift valve 200 connects a source of regulated line pressure 1X to line 128 whenever the first gear ratio is selected. A lubrication augmentation and converter lockout valve 130 includes a spool 132, which moves leftward within the valve chamber due to the effect of compression spring 134 and a pressure force developed on land 136 when line 128 is pressurized. With valve 130 in this position, fluid at SRP, carried in line 54 from valve 52 and through line 138 to the converter lockout valve 130, is connected through valve 130 to an UNLOCK line 140, which is connected to the chamber of the converter regulator valve 86 at a port located between spools 106 and 94.

When lines 140 and 88 are pressurized, there is no differential pressure across spool 106, and spool 94 is moved to the right-hand extremity of the valve chamber due to a pressure force applied to the large pressure area on the left-hand end of land 102. This action moves spool 94 rightward to the same position as previously described with respect to open torque converter operation. In this condition, torque converter clutch 38 is disengaged and the torque converter 20 operates in an open condition. In this way, valve 86 provides an independent override or lockout force on the large diameter of land 102 to ensure that the vehicle can be started and driven in first gear with the converter open, even if an obstruction is present at a port of valve 86, which obstruction might otherwise prevent spool 94 from sliding to the right-hand end of the valve chamber. This lockout or override feature also permits the torque converter to operate in an open condition even if a failure of solenoid 92 or the microprocessor control system would cause pressure in line 90 to be high. Low pressure in line 90 would be expected during normal operation, as mentioned above. In that case, SRP pressure operating on a larger land on the left-hand side of spool 94 overcomes the effect of the pressure present in line 90 and permits spool 94 to move to the open condition at the right-hand end of the chamber. This prevents stalling of the engine in reverse gear or drive conditions in the low gear ratio.

To operate the torque converter 20 in the locked condition, clutch 38 is engaged due to the presence of a larger pressure in the torque converter than the pressure in the space between the impeller casing and the friction surfaces of clutch 38. The torque converter operates in the locked condition when solenoid-operated valve 92 produces a pressure of about 50 psig in line 90, thereby moving spool 94 to the left-hand end of the valve chamber. Spool 94 moves to the left-hand end of the chamber when the UNLOCK pressure line 140 is closed at valve 130 due to the absence of 1X pressure from the 1-2 shift valve and due to the larger pressure force acting on the right-hand end of land 96 in comparison to the pressure force at the left-hand end of booster 106 produced by TCF pressure. With the valve located at the left-hand end of the chamber, line 88 is connected directly through lines 118, and through line 120 and orifice 122 to the torus of the torque converter through line 46. Fluid located between the Impeller casing 28 and clutch 38 is exhausted to reservoir through line 40 and vent port 108, thereby producing a differential pressure across the friction surfaces of clutch 30 forcing it to the locked or engaged condition. Fluid from the torque converter returns through line 44 to line 113, which directs torque converter exhaust TCX to cooler 126 through valve 78.

Microprocessor Controller

FIG. 6 shows a microprocessor that is used to control the valve circuits that in turn control distribution and exhaust of actuating pressure to the clutches and brake servos for the transmission. The processor is shown at 170 in FIG. 6.

As schematically represented in FIG. 6, an aircharge temperature sensor 172 is adapted to develop and ambient air temperature that is used by the processor in developing commands issued to the control valve system. The processor also responds to an air conditioning clutch signal from sensor 174 which indicates whether the air conditioning system is on or off.

A brake on/off switch 176 is triggered by the vehicle brakes and the on/off signal is delivered to the processor.

An engine speed sensor 178 measures crankshaft speed. Engine coolant temperature is sensed by temperature sensor 180.

The drive range selected by the operator is indicated by a manual lever position sensor 182. A transmission output shaft speed sensor 184 provides an indication of the driven shaft speed an output shaft. That speed is related to the vehicle speed signal developed by sensor 86. A transmission oil temperature signal is delivered to the processor by sensor 188. An engine throttle position signal is delivered to the processor by sensor 190.

The control valve circuit includes solenoid operated shift valves which receive shift signals. These are variable force signals from the processor. They are received by shift solenoid 192–195.

The sensor inputs, such as the engine-related sensor signals indicative of engine coolant temperature, barometric absolute pressure, etc., are used by the processor to develop more accurate outputs as the load and climate conditions change. Other inputs are based n driver commands such as the engine throttle position. Still other inputs to the processor are developed by the transmission itself, such as the output shaft speed sensor signal, the manual lever position signal, and the transmission oil temperature signal. The processor will develop the appropriate shift time and conditions for shifts in the ratio as well as control the clutch application and release. Line pressure also is developed by the processor to establish optimum shift feel.

The processor is an integrated central processor which converts signals, such as the signals from a vehicle speed sensor and an engine throttle position sensor, engine temperature sensor, turbine speed sensor, and the manual selector lever, into electrical signals for solenoid-operated valves 192–196, the solenoid valve for the converter bypass clutch 92, and the variable force solenoid for the electronic pressure control 25. The processor receives the sensor signals and operates on them in accordance with programmed control algorithms. The processor includes appropriate gates and driver circuits for delivering the output of the operation of the algorithms to the hydraulic solenoid control valves.

The processor 170 includes a central processor unit (CPU); a read-only memory (ROM), in which the control unit that includes a read-write memory or RAM; and internal busses between the memory and the central processor arithmetic logic unit.

The processor executes programs that are obtained from the memory and provides the appropriate control signals to a valve circuit as the input signal conditioning portions of the processor reads the input data and the computation logic portions deliver the results of the computation to the output driver system under the program control.

The memory includes both a random access memory (RAM) and a read-only memory (ROM), the latter storing the information that comprises the control logic. The result of the computations carried out on the input data is stored in RAM where it can be addressed, erased, rewritten or changed, depending upon the operating conditions of the vehicle The data that is stored in ROM memory may be shift schedule information or functions in which two variables, such as throttle position and vehicle speed, are related one to the other in accordance with a shift function. The data also may be in the form of information in a table containing three variables or data such as a timer value and values for the other two pieces of data or variables.

The control strategy for the transmission is divided into several routines and control modules which are executed sequentially in known fashion during each background pass The strategy for each module is executed furthermore in sequential fashion, just as the modules themselves are executed in sequential fashion. The various data registers are initialized as input data from the previously mentioned sensors are introduced into the input signal conditioning portion of the processor. The information that results from the inputting of the sensor data, together with information that is stored in memory and learned from a previous background pass, is used to carry out the control functions of the shift solenoid valves, the throttle pressure solenoid valve, and the bypass clutch solenoid valve. The modules and submodules are executed in sequence in each background loop. Each module or logic portion is independent of the others and performs a specific function. They are executed as they are separately addressed by the processor pointer. The functions occur after the input signals are received by the input gates and the signal conditioning portions of the processor and after the input signal conditioning has occurred The ability of the clutches and brakes to transmit torque depends, of course, on the level of the pressure maintained in the control circuit by the main pressure regulator. This control is unlike TV pressure controls of conventional transmissions which rely upon mechanical throttle valve linkages to maintain a desired throttle valve pressure or a vacuum diaphragm which is actuated by engine intake manifold pressure. The TV control in the present design is achieved by a variable force solenoid valve that responds to a signal developed by the electronic microprocessor. Electronic TV strategy for the processor includes the step of looking up engine torque from a table and varying appropriately the signal delivered to the variable force solenoid to adjust the torque transmitting capacity of the transmission.

Converter Lockout Valve

A lube augmentation and converter lockout valve 130 is supplied through line 128 with 1X pressure from 1-2 shift valve 200, which connects a source of regulated line pressure to line 128 in accordance with control pressure from solenoid valve 195 when operation in the first forward gear is required. Supercharge pressure SPS is carried in line 144 to a port located near the left-hand end of the chamber of valve 130. Supercharge pressure is regulated by supercharge relief valve 79 at approximately 50 psig or greater and is applied to a control land of valve 130 that is approximately five times larger than the other control lands formed on spool 132, on which other pressure signals operate to control the position of spool 132. Secondary regulated pressure SRP is carried in lines 54 and 138 to valve 130. Valve 130 is supplied also through lines 142, 204 with D321 pressure from a manual valve 202, which connects a source of regulated line pressure LP in line 24 to line 204 when the manual valve is moved by the vehicle operator's movement of the range selector (PRNDL) to any of the forward drive positions. Absence of D321 pressure is an indication of reverse drive operation of the transmission, i.e., low pressure in line 142 indicates that the vehicle operator has located the PRNDL range selector lever in the R-range. Fluid output from valve 130 is carried in line 146 through orifice 148 and filter 152 to various lubrication circuits 147–150, bypassing a temperature compensated orifice 154 to which fluid is carried from valve 130 through line 156.

Line 140 carries UNLOCK pressure to a port of valve 86 located between booster spool 106 and land 102 of spool 94. Compression spring 134 urges spool 132 and the large control lands of spool 206 leftward in the valve chamber.

A purpose of valve 130 is to prohibit engagement of clutch 38 at an inappropriate time, such as when forward or reverse engagements are initiated, yet to permit engagement of clutch 38 in all forward ranges and at low engine speeds when the transmission is operating in the second, third, fourth, and fifth gears. Essentially, lockout valve 130 compares three hydraulic pressure signals, D321, 1X, and SPS, and produce a high pressure or low pressure signal on line 140, which is applied to the converter regulator valve 86, the high pressure signal representing an UNLOCK control signal.

During conditions when the manual selector is in the park, reverse, or neutral positions, and engine speed is at idle speed or a lower speed than 2000 rpm, D321, 1X, and SPS pressures are at low magnitude; therefore, spool 132 moves to the left-hand end of the valve chamber, thereby opening a connection between secondary regulator pressure line 138 and UNLOCK line 140. The UNLOCK pressure causes the spool 94 of the converter regulator valve 86 to move to the right-hand end of its valve chamber, thereby opening a connection between torque converter feed line 88 and line 40, through which pressure is applied to the space between the impeller cover and the friction surfaces of clutch 38. This action disengages the clutch and opens the torque converter.

When the transmission is operating in the D range in first gear at engine idle speed or at engine speed less than 2000 rpm, or in the manually selected first gear ratio with engine speed below 2000 rpm, D321 pressure tends to cause spool 132 to move rightward and 1X pressure tends to move the spool leftward. Therefore, since D321 and 1X pressure are at substantially the same line pressure magnitude and SPS pressure is low, the position of spool 132 is determined by the effect of spring 134, thereby opening SRP line 138 to the UNLOCK line 140, and clutch 138 is disengaged as described immediately above.

With the transmission operating in the reverse or R-range with engine speed above 3000 rpm or in the drive or D-range in first gear with engine speed above 3000 rpm, D321 and 1X pressure have substantially equal magnitude and virtually no net effect on the position of spool 132. But SPS pressure (approximately 50 psig or greater) operating on lands 206 moves spool 132 rightward against the effect of spring 134. As engine speed rises above 3000 rpm, SPS pressure increases in order to save power; therefore, the SPS related pressure force on the end of land 206 increases and moves spool 132 to the right-hand end of the valve chamber. This action closes communication between SRP line 138 and UNLOCK line 140; therefore, converter regulator valve 86 operates as above described when UNLOCK pressure is absent from the left-hand end of spool 94.

With the transmission operating in first gear, either in the manual range or in the drive range and with engine speed greater than approximately 3000 rpm, D321 pressure tends to move spool 132 rightward and 1X pressure tends to move spool 132 leftward, thereby effectively canceling the pressure force acting in the opposite direction caused by D321 pressure at the left-hand end of spool 132. In this case, SPS pressure operates against the effect of spring 134, moves the spool to the right-hand end of the valve chamber, and closes SRP line 138 to UNLOCK line 140. Therefore, converter regulator valve 86 operates as above described when UNLOCK pressure is absent from the left-hand end of spool 94.

With the transmission operating in second gear through fifth gear in the drive range and with engine speed above 3000 rpm, 1X pressure is absent at the right-hand end of spool 132, D321 pressure is present at the left-hand end of the spool, and SPS pressure operates on lands 206 to move spool 132 to the right-hand end of the valve chamber, thereby closing opening SRP pressure line 138 to UNLOCK line 140.

When the manual gear selector is in the D-range and the transmission operates in the second through fifth forward speed ratios with engine speed in the range 800–1200 rpm, SPS and 1X pressures are low or absent at valve 130, but D321 pressure forces spool 132 against spring 134 to the right-hand end of the valve chamber, thereby closing the connection between SRP line 138 and UNLOCK line 140. In this position, the TC regulator valve 86 operates as previously described in the absence of UNLOCK pressure so that the converter clutch is either opened or closed in accordance with the pressure control signals at valve 86. UNLOCK line 140 is vented through port 160 when spool 132 moves to the right-hand end of its valve chamber.

The flow rate to lubrication circuits 147–150 is relatively low at engine idle speeds, but as transmission output shaft speed rises, the lubrication requirement increases. An object of the control strategy is to prevent torque converter lockup when the lubrication requirement is low. To produce this effect, when spool 132 is moved leftward, as it is when engine speed and SPS pressure are low, fluid flow through line 156 is closed by spool 132 from a connection to line 146, thereby preventing any augmentation of the lube flow through line 146 to the lubrication circuits 147–150. In this condition, torque converter lockup is prohibited.

However, when engine speed and SPS pressure increase, spool 132 moves to the right-hand end of the valve chamber, thereby opening a connection between lube line 156 and line 146. This action increases the flow to lubrication circuits 147–150. In this condition, the torque converter will operate in either the locked or UNLOCKED mode, depending upon the effect of the various pressure control signals on valve 86, but with UNLOCK pressure vented to sump.

Clutch Capacity Pressure Regulator

Solenoid operated line pressure valve 25 produces a line pressure control. LPC pressure signal, preferably in the form of several abrupt changes in magnitude or alternatively as a linearly increasing magnitude carried in line 210 to the left-hand end of the clutch capacity pressure regulator CCPR valve 212. LPC is regulated by applying a variable voltage to the solenoid of valve 25, a signal produced as output by the microprocessor 170 in response to the result of a control algorithm executed by the microprocessor. Pressure D321, a control pressure signal, is carried in line 204 to the differential area of control lands 214, 216 and produces a pressure force tending to move spool 218 leftward against the effect of spring 220. Fluid at SRP is carried in line 222 to valve 212 and in line 224 to the solenoid-operated line pressure valve 25.

Line pressure is carried to valve 212 through line 226 to a port that is opened and closed by land 228 to SPS excess relief line 230, which is connected through valve 52, line 76, supercharge relief valve 79, and nozzle 24 to the suction side of pump 22.

Check valve 231 alternately opens a connection between SRP line 222 and line 226 when spool 218 and land 28 move rightward within the valve chamber, or closes that connection when line pressure exceeds the magnitude of SRP.

In operation, when the vehicle operator moves the range selector to the drive range from the neutral or reverse ranges, several friction elements, perhaps one to three hydraulically-actuated clutches and brakes, must be filled and stroked rapidly at approximately 40 psig in order to dispose the clutch elements to complete the gear ratio change in about 250–500 ms. As the friction elements are filled and stroked, line pressure decreases due to the abrupt high flow requirement; therefore, spool 218 moves toward the right-hand end of the valve chamber because line pressure fed back to the end of the spool is lower than the effect of the other forces acting on the valve, including the force of spring 220. When this occurs, valve 212 stops relieving line pressure by closing the connection between lines 226 and 230 by moving land 228 across the corresponding ports. Then, virtually all the flow produced by pump 22 is directed to the friction elements, which include a forward clutch, reverse servo, an intermediate clutch, direct clutch, and overdrive clutch.

However, the friction elements require greater volume than can be supplied from pump 22, so line pressure magnitude continues to fall low enough so that the forces acting on valve spool 218 are insufficient to prevent spring 220 from moving spool 218 entirely to the right-hand extremity of the valve chamber. With the valve so positioned, land 228 continues to close the connection between lines 226 and 230, but opens a connection between SRP line 222 and line 226 through check valve 231. After this connection is opened, the friction element flow demand is connected to the output of pump 16, which produces a high flow rate. In this way, flow produced by pumps 16 and 22 are combined to supply the friction elements.

As a consequence of SRP being supplied to the friction elements, the magnitude of SRP pressure decreases, thereby allowing spool 56 of the secondary regulated pressure valve 52 to move toward the right end of the valve chamber to close the connection between lines 54 and 88, through which the torque converter clutch 38 is supplied. This action decreases the flow rate of fluid carried in line 88 through valve 86 and line 40 to the space between the impeller housing and clutch 38.

As pressure in the oncoming friction elements rises, line pressure rises and spool 214 moves leftward within its valve chamber, first closing the connection between lines 226 and 222 so that the flow rate from pump 16 is thereafter delivered to the torque converter regulator valve 86 through lines 54, 82, and 88. Eventually, as the pressure in oncoming friction elements and line pressure rises sufficiently high, spool 214 moves to the left-hand extremity of the valve chamber until land 228 opens a connection between line 226 and 230, allowing the excess flow to be relieved and delivered to the inlet of pump 22.

What is claimed is:

1. A system for controlling locked and unlocked operation of a converter clutch, comprising:

a torque converter having an impeller, turbine and stator defining a toroidal fluid flow path, a converter clutch for driveably connecting and releasing the impeller and turbine;

a first line for supplying pressurized fluid to a first side of the converter clutch;

a second line for venting and pressurizing a second side of the converter clutch;

a vent port;

a source of converter feed pressure;

lockout means for producing converter unlock pressure having a first magnitude representing a command to unlock the converter and a second magnitude representing a command to lock the converter;

a source of converter control pressure producing a variable pressure including a third magnitude representing a command to unlock the converter and a fourth magnitude representing a command to lock the converter;

a converter regulator valve means for unlocking the converter clutch by opening a connection between the source of converter feed pressure and the first and second lines when the lockout means produces the first magnitude, or the lockout means produces the second magnitude and the source of converter control pressure produces the third magnitude, and for locking the converter clutch by opening a connection between the source of converter feed pressure and the first line and between the second line and the vent port when the lockout means produces the second magnitude and the source of converter control pressure produces the fourth magnitude.

2. The system of claim 1 wherein the lockout means comprises a lockout valve including:

a source of actuating pressure communicating with the lockout valve;

a third line connecting the lockout valve and converter regulator valve means;

a spool having control lands on which first pressure forces representing a requirement that the converter clutch be unlocked and second pressure forces representing a requirement that the converter clutch be locked are developed in mutual opposition;

means for opening and closing a connection between the source of actuating pressure and the third line in response to the relative magnitude of the first and second pressure forces.

3. The system of claim 2 wherein a connection between the source of actuating pressure and third line is opened when the first pressure forces exceed the second pressure forces, and a connection between the source of actuating pressure and third line is locked when the first pressure forces exceed the second pressure forces.

4. The system of claim 1 wherein the converter regulator valve means comprises:

a valve body defining a valve chamber, communicating with the source of converter feed pressure, first line, second line and vent port;

a spool slidable in the valve chamber, having multiple control lands including a first control land communicating with the source of converter control pressure and adapted to have a control force applied thereto, a second control land communicating with the lockout means and adapted to have a control force applied thereto, a third control land adapted to open a connection among the source of converter feed pressure, first line, and second line when the spool moves to a position corresponding to unlocked converter clutch operation in response to control forces applied to the spool corresponding to unlocked converter clutch operation, and adapted to open a connection between the vent port and second line and to open a connection between converter feed pressure and first line when the spool moves to a position corresponding to open converter clutch operation in response to control forces applied to the spool corresponding to locked converter clutch operation.

5. The system of claim 4 wherein the converter regulator valve means further comprises a compression spring biasing the spool toward a position corresponding to unlocked converter clutch operation.

6. A system for controlling locked and unlocked operation of a converter clutch, comprising:

a torque converter having an impeller, turbine and stator defining a toroidal fluid flow path, a converter clutch for driveably connecting and releasing the impeller and turbine;

a first line for supplying pressurized fluid to a first side of the converter clutch;

a second line for venting and pressurizing a second side of the converter clutch;

a source of converter feed pressure;

lockout means for producing converter unlock pressure having a first magnitude representing a command to unlock the converter and a second magnitude representing a command to lock the converter;

a source of converter control pressure producing a variable pressure including a third magnitude representing a command to unlock the converter and a fourth magnitude representing a command to lock the converter;

a converter regulator valve means comprising:

a valve body defining a valve chamber, communicating with the source of converter feed pressure, first line, second line and a vent port;

a spool slidable in the valve chamber, having multiple control lands including a first control land communicating with the source of converter control pressure and adapted to have a control force applied thereto, a second control land communicating with the lockout means and adapted to have a control force applied thereto, a third control land adapted to open a connection among the source of converter feed pressure, first line, and second line when the spool moves to a position corresponding to unlocked converter clutch operation in response to control forces applied to the spool corresponding to unlocked converter clutch operation, and adapted to open a connection between the vent port and second line and to open a connection between converter feed pressure and first line when the spool moves to a position corresponding to locked converter clutch operation in response to control forces applied to the spool corresponding to locked converter clutch operation.

7. The system of claim 6 wherein the converter regulator valve means further comprises a compression spring biasing the spool toward a position corresponding to unlocked converter clutch operation.

* * * * *